(12) United States Patent
Ido et al.

(10) Patent No.: US 8,323,766 B2
(45) Date of Patent: Dec. 4, 2012

(54) HONEYCOMB STRUCTURE

(75) Inventors: Takahiko Ido, Gifu (JP); Chizuru Kasai, Gifu (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 1051 days.

(21) Appl. No.: 12/239,342

(22) Filed: Sep. 26, 2008

(65) Prior Publication Data

US 2009/0246456 A1 Oct. 1, 2009

(30) Foreign Application Priority Data

Mar. 27, 2008 (WO) .................. PCT/JP2008/055976

(51) Int. Cl.
*B32B 3/12* (2006.01)
(52) U.S. Cl. ....................................... 428/116
(58) Field of Classification Search .................. None
See application file for complete search history.

(56) References Cited

U.S. PATENT DOCUMENTS

| | | |
|---|---|---|
| 2002/0077248 A1 | 6/2002 | Nakanishi et al. |
| 2002/0103078 A1 | 8/2002 | Hu et al. |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandopoulos et al. |

FOREIGN PATENT DOCUMENTS

| | | |
|---|---|---|
| EP | 0460388 | 12/1991 |
| EP | 0582917 | 2/1994 |
| EP | 1717218 | 11/2006 |
| GB | 1524886 | 9/1978 |
| JP | S52-39709 | * 3/1977 |
| JP | 3-65306 | 3/1991 |
| JP | 6-58138 | 3/1994 |
| JP | 2002-159859 | 6/2002 |
| JP | 2003-112048 | 4/2003 |
| JP | 2007-229700 | 9/2007 |
| WO | WO 2005/063653 | 7/2005 |

OTHER PUBLICATIONS

Schreier et al., "Sulphur trap materials based on mesoporous $Al_2O_3$,", Applied Catalysis B: Environmental, 2006, pp. 249-260, vol. 65, Elsevier B.V.
European Office Action for corresponding EP Application No. 08 015 202.8-2111, Jan. 7, 2010.
U.S. Appl. No. 12/379,768, filed Feb. 27, 2009, Yoshida.
U.S. Appl. No. 12/516,813, filed May 29, 2009, Ogura et al.

(Continued)

*Primary Examiner* — David Sample
(74) *Attorney, Agent, or Firm* — Ditthavong Mori & Steiner, P.C.

(57) ABSTRACT

A honeycomb structure includes at least one honeycomb unit having a longitudinal direction. The honeycomb unit includes SOx storage agent, inorganic particles, inorganic binder, and a partition wall extending along the longitudinal direction to define plural through holes. An expression $Y \geq -26X+40000$ ($0 < X \leq$ approximately 500) is satisfied, wherein "X" represents an amount [g] of SOx stored in the honeycomb structure, and "Y" represents a specific surface area [$m^2$/L] of the honeycomb structure when "X" [g] of SOx is stored in the honeycomb structure.

24 Claims, 3 Drawing Sheets

OTHER PUBLICATIONS

U.S. Appl. No. 12/407,645, filed Mar. 19, 2009, Ohno et al.
U.S. Appl. No. 12/248,625, filed Oct. 9, 2008, Kunieda et al.
U.S. Appl. No. 12/271,216, filed Nov. 14, 2008, Ohno et al.
U.S. Appl. No. 12/368,514, filed Feb. 10, 2009, Kunieda et al.
U.S. Appl. No. 12/346,628, filed Dec. 30, 2008, Ohno et al.
U.S. Appl. No. 12/346,610, filed Dec. 30, 2008, Kunieda et al.
U.S. Appl. No. 12/367,780, filed Feb. 9, 2009, Ohno et al.
U.S. Appl. No. 12/389,338, filed Feb. 19, 2009, Ohno et al.
U.S. Appl. No. 12/358,937, filed Jan. 23, 2009, Ohno et al.
U.S. Appl. No. 12/389,343, filed Feb. 19, 2009, Ohno et al.
U.S. Appl. No. 12/359,957, filed Jan. 26, 2009, Ohno et al.
U.S. Appl. No. 12/343,965, filed Dec. 24, 2008, Ohno et al.
U.S. Appl. No. 12/359,969, filed Jan. 26, 2009, Ohno et al.
U.S. Appl. No. 12/369,347, filed Feb. 11, 2009, Ohno et al.
U.S. Appl. No. 12/372,192, filed Feb. 17, 2009, Ohno et al.
U.S. Appl. No. 12/372,229, filed Feb. 17, 2009, Ohno et al.
U.S. Appl. No. 12/368,551, filed Feb. 10, 2009, Ohno et al.
U.S. Appl. No. 12/362,310, filed Jan. 29, 2009, Ohno et al.
U.S. Appl. No. 12/355,999, filed Jan. 19, 2009, Ohno et al.
U.S. Appl. No. 12/355,990, filed Jan. 19, 2009, Ohno et al.

* cited by examiner

HONEYCOMB STRUCTURE

CROSS-REFERENCE TO RELATED APPLICATIONS

The present application claims priority under 35 U.S.C §119 to PCT/JP2008/055976 filed Mar. 27, 2008, the entire contents of which are hereby incorporated herein by reference.

BACKGROUND OF THE INVENTION

1. Field of the Invention

The present invention relates to a honeycomb structure.

2. Description of the Related Art

Conventionally, as a honeycomb catalyst used for purifying exhaust gas of vehicles, platinum is carried on a layer made of activated alumina and the like having a larger specific surface area, the layer being formed on a surface of a honeycomb structure made of cordierite. Further, as a honeycomb catalyst for converting exhaust gas of diesel engines, NOx storage agent is further carried so as to treat NOx in an oxygen-enriched atmosphere.

The NOx storage agent, however, is more likely to stably store SOx rather than NOx. Because of this feature, SOx poisoning in which the NOx storage agent stores SOx occurs and, disadvantageously NOx cannot adequately stored.

To solve the problem, according to Japanese Patent Laid-Open Publication No. 6-58138, a sulfur capturing device is provided in an exhaust gas passage on an upstream side with respect to the place where NOx storage agent is provided. The sulfur capturing device includes a sulfur absorbing agent and a casing enclosing the sulfur absorbing agent. As the sulfur absorbing agent, a noble metal such as platinum in addition to any one metal selected from a group consisting of an alkali metal such as potassium, sodium, lithium, and cesium, an alkali-earth metal such as barium an calcium, and a rare earth metal such as lanthanum and yttrium are carried on alumina carrier. Further, a honeycomb structure as described in WO 05/063653A is disclosed.

The contents of Japanese Patent Laid-open Publication No. 6-58138 and WO 05/063653A are incorporated by reference in their entirety.

SUMMARY OF THE INVENTION

According to an aspect of the present invention, a honeycomb structure includes at least one honeycomb unit having a longitudinal direction. The honeycomb unit includes SOx storage agent, inorganic particles, inorganic binder, and a partition wall extending along the longitudinal direction to define plural through holes. An expression $Y \geq -26X+40000$ ($0 < X \leq$ approximately 500) is satisfied, wherein "X" represents an amount [g] of SOx stored in the honeycomb structure, and "Y" represents a specific surface area [m$^2$/L] of the honeycomb structure when "X" [g] of SOx is stored in the honeycomb structure.

DETAILED DESCRIPTION OF THE PREFERRED EMBODIMENTS

Next, exemplary embodiments of the present invention are described with reference to the accompanying drawings.

Figure 1A:
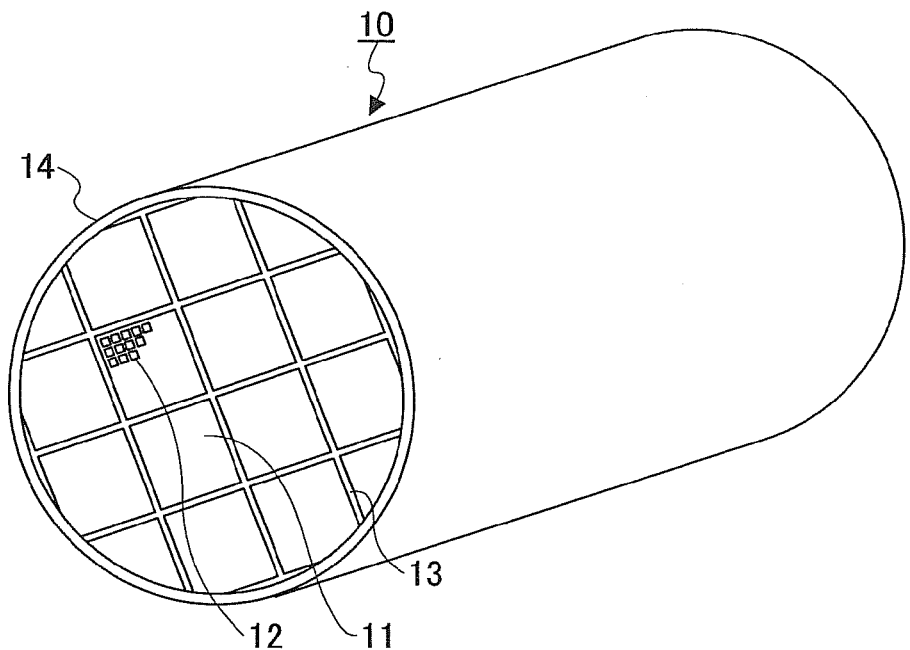
FIG. 1A is a perspective view showing an example of a honeycomb structure according to an embodiment of the present invention.
Figure 1B:
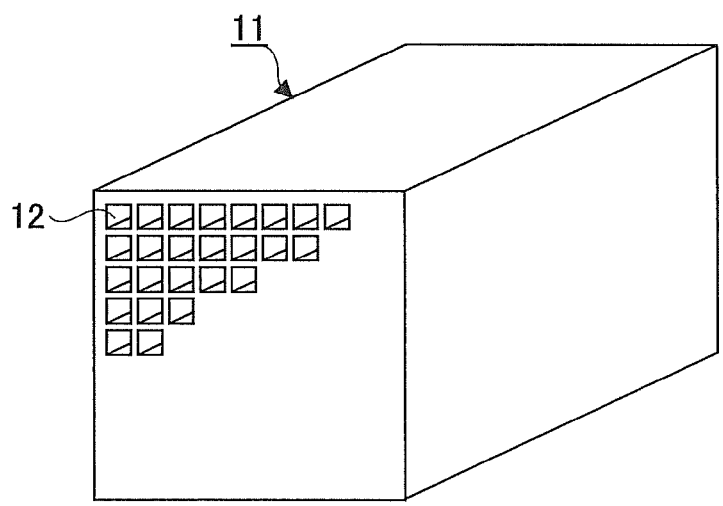
FIG. 1B is a perspective view showing a honeycomb unit in FIG. 1A.

FIGS. 1A and 1B show an example of a honeycomb structure 10 according to an embodiment of the present invention. As shown in FIG. 1A, the honeycomb structure 10 includes plural honeycomb units 11. Each honeycomb unit 11 has partition walls and plural through holes 12 within the partition walls. The honeycomb units 11 are arranged in a longitudinal direction of the honeycomb structure 10 and are adhered to each other by interposing adhesive layers 13 provided between the honeycomb units 11. An outer peripheral surface of the honeycomb structure 10 is covered with an outer coating layer 14. In this configuration, the honeycomb unit 11 includes SOx storage agent, inorganic fibers, and inorganic binder. Further, a specific surface area $Y[m^2/L]$ of the honeycomb structure 10 when X[g] of SOx is stored therein satisfies the following relationship:

$$Y \geq -26X+40000 \ (0 < X \leq \text{approximately } 500)$$

When this relationship is satisfied, it becomes easier to control the degradation of SOx storing performance caused by heating the honeycomb structure 10. Because of this feature, by disposing the honeycomb structure 10 on the upstream side of a honeycomb structure 10 that includes NOx storage agent, it becomes easier to control the SOx poisoning of the NOx storage agent.

When the limit of the dispersion of SOx storage agent and the like is taken into account, the specific surface area $Y[m^2/L]$ is preferably equal to or less than approximately 70000 $[m^2/L]$.

The SOx storage agent is not specifically limited as long as the SOx storage agent reacts with SOx and stores the SOx as sulfate. The SOx storage agent may be any one of an alkali metal such as sodium and potassium and an alkali-earth metal such as magnesium, calcium, and barium or a combination thereof.

It should be noted that the SOx storage agent may be included in the partition wall of the honeycomb unit 11 or be supported on the partition wall. Further, the SOx storage agent may be partially included in the partition wall of the honeycomb unit 11 and partially be supported on the partition wall. In this case, the SOx storage agent included in the partition wall may be the same as or different from the SOx storage agent be supported on the partition wall.

Preferably, the content of the SOx storage agent in the partition wall of the honeycomb structure 10 is in the range of approximately 1.0 mol/L to approximately 2.5 mol/L. When the content of the SOx storage agent in the partition wall is equal to or more than approximately 1.0 mol/L, it may become easy to maintain the performance of storing SOx, thereby facilitating the reduction of the size of the honeycomb structure 10. On the other hand, when the content of the SOx storage agent in the partition wall is equal to or less than approximately 2.5 mol/L, the manufacturing the honeycomb structure 10 is apt to be less difficult.

The inorganic particles are not specifically limited as long as the inorganic particles are made of inorganic compound excluding the SOx storage agent and capable of increasing the specific surface area of the honeycomb structure 10 to allow the SOx storage agent to store SOx more easily. The inorganic particles may be alumina, titania, silica, zirconia, ceria, mullite, zeolite, and the like or a combination thereof. Especially, it is most preferable to use alumina.

Preferably, the average particle diameter of the inorganic particles is in the range of approximately 0.1 µm to approximately 10 µm. When the average particle diameter is equal to or more than approximately 0.1 µm, it becomes not necessary to add a large amount of inorganic binder. As a result, it may not become difficult to perform extrusion molding. On the other hand, when the average particle diameter is eaual to or less than approximately 10 µm, the effect of increasing the specific surface area of the honeycomb assembly 10 may not become insufficient.

The content of inorganic particles in the honeycomb unit 11 is preferably in the range of approximately 30 wt % to approximately 90 wt %, more preferably in the range of approximately 40 wt % to approximately 80 wt %, and still more preferably in the range of approximately 50 wt % to approximately 75 wt %. When the content of inorganic particles is equal to or more than approximately 30 wt %, the specific surface area of the honeycomb unit 11 may be hardly decreased. On the other hand, when the content of inorganic particles is equal to or less than approximately 90 wt %, the strength of the honeycomb unit 11 may hardly be reduced.

The inorganic binder is not specifically limited, but may be solid content included in alumina sol, silica sol, titania sol, liquid glass, sepiolite, attapulgite, and the like or a combination thereof.

The content of inorganic binder in the honeycomb unit 11 is preferably in the range of approximately 5 wt % to approximately 50 wt %, more preferably in the range of approximately 10 wt % to approximately 40 wt %, and still more preferably in the range of approximately 15 wt % to approximately 35 wt %. When the content of inorganic binder is equal to or more than approximately 5 wt %, the strength of the honeycomb unit 11 may hardly be reduced. On the other hand, when the content of inorganic particles is equal to or less than approximately 50 wt %, molding may hardly become difficult More preferably, the honeycomb unit 11 further includes inorganic fibers. By doing this, the strength of the honeycomb unit 11 may become easier to improve.

The inorganic fibers are not specifically limited as long as the strength of the honeycomb unit 11 can be improved. The inorganic fibers may be alumina, silica, silicon carbide, silica-alumina, glass, potassium titanate, aluminum borate, and the like or a combination thereof.

The aspect ratio of the inorganic fibers is preferably in the range of approximately 2 to approximately 1000, more specifically in the range of approximately 5 to approximately 800, and still more preferably in the range of approximately 10 to approximately 500. When the aspect ratio is equal to or more than approximately 2, the effect of improving the strength of the honeycomb unit 11 may hardly be reduced. On the other hand, when the aspect ratio is equal to or less than approximately 1000, clogging or the like may hardly occur during molding such as extrusion molding. Further, inorganic fibers may hardly be broken during molding, thereby hardly reducing the effect of improving the strength of the honeycomb unit 11.

The content of the inorganic fibers in the honeycomb unit 11 is preferably in the range of approximately 3 wt % to approximately 50 wt %, more preferably in the range of approximately 5 wt % to approximately 40 wt %, and still more preferably in the range of approximately 8 wt % to approximately 30 wt %. When the content of the inorganic fibers is equal to or more than approximately 3 wt %, the effect of improving the strength of the honeycomb unit 11 may hardly be reduced. On the other hand, when the content of the inorganic fibers is equal to or less than approximately 50 wt %, the specific surface area of the honeycomb unit 11 may hardly be decreased.

The area of a cross section perpendicular to the longitudinal direction of the honeycomb unit 11, namely perpendicular to the through holes 12, is preferably in the range of approximately 5 $cm^2$ to approximately 50 $cm^2$. When the cross-sectional area is equal to or more than approximately 5 $cm^2$, the specific surface area of the honeycomb unit 11 may hardly be decreased and the pressure loss of the honeycomb unit 11 may hardly be increased. On the other hand, when the cross-sectional area is equal to or less than approximately 50 $cm^2$, the strength against the thermal stress produced in the honeycomb unit 11 may hardly become insufficient.

The thickness of the partition wall separating the through holes 12 of the honeycomb units 11 is preferably in the range of approximately 0.05 mm to approximately 0.35 mm, more preferably in the range of approximately 0.10 mm to approximately 0.30 mm, and still more preferably in the range of approximately 0.15 mm to approximately 0.25 mm. When the thickness of the partition wall is equal to or more than approximately 0.05 mm, the strength of the honeycomb unit 11 may hardly be reduced. On the other hand, when the thickness of the partition wall is equal to or less than approximately 0.35 mm, the performance of storing SOx may hardly be reduced because exhaust gas can easily penetrate inside the partition wall.

Further, the number of through holes 12 per 1 $cm^2$ of cross section perpendicular to the longitudinal direction of the honeycomb unit 11 is preferably in the range of approximately 15.5 to approximately 186, more preferably in the range of approximately 46.5 to approximately 170.5, and still more preferably in the range of approximately 62.0 to approximately 155. When the number of through holes 12 per 1 $cm^2$ is equal to or more than approximately 15.5, the strength of the honeycomb unit 11 may hardly be reduced. On the other hand, when the number of through holes 12 per 1 $cm^2$ is eaual to or less than approximately 186, the pressure loss of the honeycomb unit 11 may hardly be increased.

The thickness of the adhesive layers 13 adhering the honeycomb units 11 with each other is preferably in the range of approximately 0.5 mm to approximately 2 mm. When the thickness of the adhesive layers 13 is equal to or more than approximately 0.5 mm, the adhesive strength may hardly become insufficient. On the other hand, when the thickness of the adhesive layers 13 is equal to or less than approximately 2 mm, the specific surface area of the honeycomb unit 11 may hardly be decreased and the pressure loss of the honeycomb structure 10 may hardly be increased.

The thickness of the outer coating layer 14 is preferably in the range of approximately 0.1 mm to approximately 3 mm. When the thickness of the outer coating layer 14 is equal to or more than approximately 0.1 mm, the effect of improving the strength of the honeycomb structure 10 may hardly become insufficient. On the other hand, when the thickness of the outer coating layer 14 is equal to or less than approximately 3 mm, the specific surface area of the honeycomb structure 10 may hardly be decreased.

The honeycomb structure 10 in FIG. 1A has a cylindrical shape. However, the shape of the honeycomb structure 10 according to an embodiment of the present invention is not specifically limited to this shape, but may have another shape such as a rectangular pillar shape and a cylindroid shape.

Similarly, the honeycomb unit 11 has a square pillar shape. However, the shape of the honeycomb unit 11 according to an embodiment of the present invention is not specifically limited to this shape, but preferably may have a shape capable of easily adhering to other honeycomb units such as a hexagonal pillar shape.

Further, the through hole 12 in FIG. 1B has a square pillar shape. However, the shape of the through holes 12 according to an embodiment of the present invention is not specifically limited to this shape, but may have another shape such as a triangular pillar shape and a hexagonal pillar shape.

It should be noted that a noble metal catalyst may be supported on the partition wall of the honeycomb unit 11. The noble metal catalyst is not specifically limited as long as the noble metal catalyst can oxidize $SO_2$ to $SO_3$. The noble metal catalyst may be platinum, palladium, rhodium, and the like or a combination thereof.

When a sulfur capturing device such Japanese Patent Laid-open Publication No. 6-58138 is used, however, it is necessary to absorb a large amount of sulfur, which necessarily increases the size. To solve this problem, there is provided a honeycomb structure including plural porous honeycomb units as disclosed in International Publication No. WO05/063653. Each honeycomb unit includes first inorganic material (for example, ceramic particles), second inorganic material (for example, inorganic fibers or ceramic particles each having a large particle diameter), and inorganic binder. Further, each honeycomb unit has plural through holes and an outer surface where no opening of the through hole is formed. A plurality of the honeycomb units are adhered to each other in a manner so that the outer surfaces thereof are adhered to each other by interposing sealing layers to form the honeycomb structure. The size of such a honeycomb structure may be easily reduced because of its larger specific surface area.

When such a honeycomb structure is used for absorbing SOx, unfortunately, due to the heat repeatedly be conveyed from exhaust gas, the specific surface area may be easily reduced and the performance of storing SOx may also be easily reduced.

In a honeycomb structure according to an embodiment of the present invention, it may become easier to control the degradation of SOx storage performance caused by heat repeatedly be conveyed from exhaust gas.

Next, an exemplary method of manufacturing the honeycomb structure 10 according to an embodiment of the present invention is described. First, a molding such as extrusion molding is performed using raw material paste including inorganic particles and inorganic binder, and may further include SOx storage agent and inorganic fibers, to form a raw honeycomb molded body having plural through holes 12 extending in the direction parallel to the longitudinal direction of the honeycomb molded body and separated from each other by the partition walls. By doing this, the honeycomb unit 11 having sufficient strength is obtained even if the firing temperature is low.

It should be noted that the inorganic binder included in the raw material paste is not specifically limited, but may be solid content included in alumina sol, silica sol, titania sol, liquid glass, sepiolite, attapulgite, and the like or a combination thereof.

Further, organic binder, dispersion medium, molding aid, or the like may be adequately added to the raw material paste as needed.

The organic binder is not specifically limited, but may be methylcellulose, carboxymethylcellulose, hydroxyethelcellulose, polyethyleneglycol, phenol resin, epoxy resin, and the like or a combination thereof. It should be noted that additive amount of the organic binder is preferably in the range of approximately 1% to approximately 10% with respect to the total weight of the inorganic particles, inorganic fibers and inorganic binder.

The dispersion medium is not specifically limited, but may be water, organic solvent such as benzene, alcohol such as methanol, and the like or a combination thereof.

The molding aid is not specifically limited, but may be ethylene glycol, dextrin, fatty acid, fatty acid soap, polyalcohol, and the like or a combination thereof.

It is preferable that a mixing and kneading operation be performed when the raw material paste is prepared. An apparatus such as a mixer or an attritor may be used for the mixing, and an apparatus such as a kneader may be used for the kneading.

Next, the thus-obtained honeycomb molded body is dried using a drying apparatus such as a microwave drying apparatus, a hot air drying apparatus, a dielectric drying apparatus, reduced pressure drying apparatus, vacuum drying apparatus, or a freeze drying apparatus.

Further, the obtained honeycomb molded body is degreased. The degreasing condition is not specifically limited as long as the condition is appropriate in accordance with a kind or amount of organic substance included in the molded body, but is preferably to heating at a temperature of approximately 400° C. for approximately two hours.

Further, the obtained honeycomb molded body is fired to form the honeycomb unit 11. The firing temperature is preferably in the range of approximately 600° C. to approximately 1200° C., and more preferably in the range of approximately 600° C. to approximately 1000° C. When the firing temperature is equal to or more than approximately 600° C., the process of sintering process may hardly be difficult, thereby hardly reducing the strength of the honeycomb structure 10. On the other hand, when the firing temperature is equal to or less than approximately 1200° C., the process of sintering may hardly occur, thereby hardly reducing the specific surface area of the honeycomb structure 10.

Next, a paste for the adhesive layers 13 is applied on the outer peripheral surface of the honeycomb units 11. The plural honeycomb units 11 are sequentially adhered to each other and dried and solidified to form an assembly of the honeycomb units 11. In this case, after the assembly of the honeycomb units 11 is formed, the assembly of the honeycomb units 11 may be cut into a cylindrical shape and polished. Alternatively, the honeycomb units 11 formed in a fan shape or a square shape in cross section thereof may be adhered to each other to form an assembly of the honeycomb units 11 having a cylindrical shape.

The paste for the adhesive layers 13 is not specifically limited, but may be a mixture of inorganic binder and inorganic particles, a mixture of inorganic binder and inorganic fibers, a mixture of inorganic binder, inorganic particles and inorganic fibers, or the like.

Further, the paste for the adhesive layers 13 may include organic binder. The organic binder is not specifically limited, but may be polyvinyl alcohol, methylcellulose, ethylcellulose, carboxymethylcellulose, and the like or a combination thereof.

Next, a paste for the outer peripheral coating layer 14 is applied on the outer peripheral surface of the assembly of the honeycomb units 11 having a cylindrical shape and dried and solidified. The material of the paste for the outer peripheral coating layer 14 may be the same as or different from that of the paste for the adhesive layers 13. Further, the composition of the paste for the outer peripheral coating layer 14 may be the same as that of the paste for the adhesive layers 13.

Next, the assembly of the honeycomb units 11 with the paste for the outer peripheral coating layer 14 applied thereon is dried and solidified to obtain the honeycomb structure 10. In this case, when the paste for the adhesive layers 13 and/or the paste for the outer peripheral coating layer 14 includes organic binder, it is preferable to perform degreasing. The conditions for degreasing may be selected as long as the conditions are appropriate in accordance with a kind or amount of the organic substance included in the above-mentioned paste, but is preferably to heat at a temperature of approximately 700° C. for approximately two hours.

Further, when necessary, SOx storage agent and/or a noble metal catalyst are supported on the partition walls of the honeycomb structure 10. A method of supporting the SOx storage agent and/or the noble metal catalyst is not specifically limited, but may be an impregnating method or the like.

Figure 2:
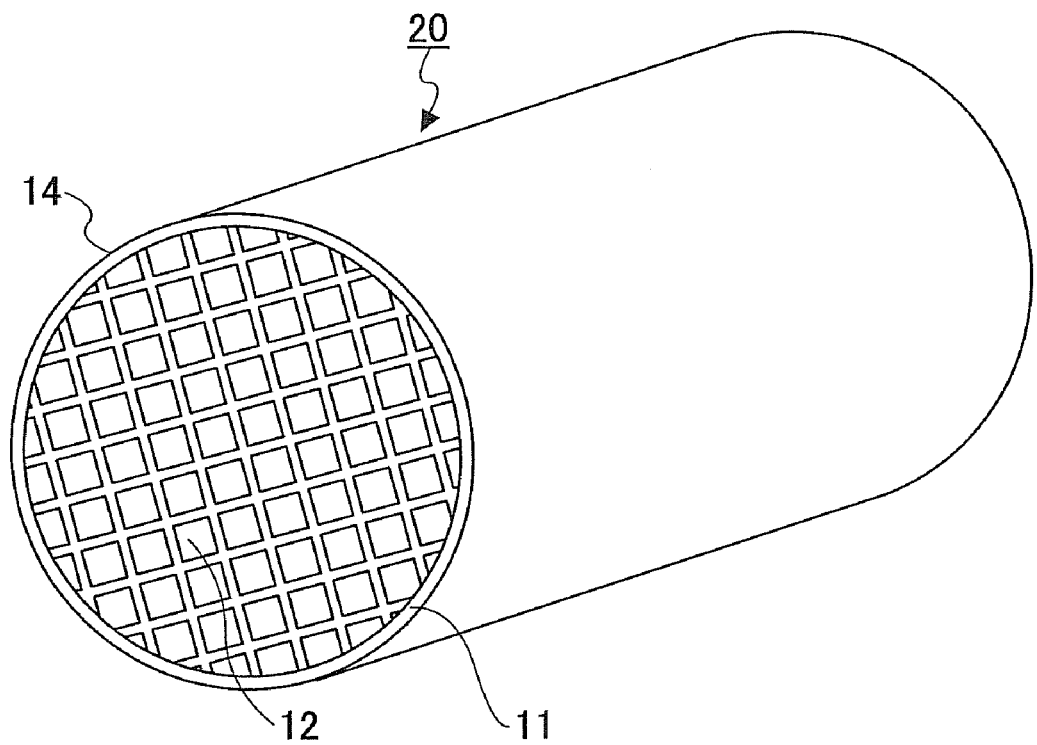
FIG. 2 is a perspective view showing another example of the honeycomb structure according to another embodiment of the present invention.

FIG. 2 shows another example of a honeycomb structure 20 according to an embodiment of the present invention. The honeycomb structure 20 is the same as the honeycomb structure 10 except that the honeycomb structure 20 includes a single honeycomb unit 11 having plural through holes 12 extending in the direction in parallel to the longitudinal direction of the honeycomb unit 11 and separated from each other by partition walls.

It should be noted that a honeycomb structure according to an embodiment of the present invention may or may not have the outer peripheral coating layer 14.

EXAMPLE

Example 1

First, 1070 g of magnesium oxide as SOx storage agent, 1180 g of γ alumina having an average particle diameter of 2 μm as inorganic particles, 680 g of alumina fibers having an average fiber diameter of 6 μm and an average fiber length of 100 μm as inorganic fibers, 2600 g of alumina sol having solid content of 20 wt % as a component in inorganic binder, and 320 g of methylcellulose as organic binder are mixed and kneaded to obtain raw material paste. Next, the thus-obtained raw material paste is extrusion-molded by using an extrusion molding apparatus to obtain raw honeycomb molded body. Next, the thus-obtained a raw honeycomb molded body is dried by using a microwave drying apparatus and a hot air drying apparatus, then degreased at a temperature of 400° C. for two hours, and then fired at a temperature of 700° C. for two hours to obtain a honeycomb unit having a square pillar shape, sizes of 35 mm (breadth)×35 mm (width)×68 mm (height), plural through holes, the number of the through holes per 1 $cm^2$ of a cross section perpendicular to the longitudinal direction being 93, and the thickness of the partition walls of 0.2 mm.

Next, 26 parts by weight of γ alumina having an average particle diameter of 2 μm, 37 parts by weight of alumina fibers having an average fiber diameter of 0.5 μm and an average fiber length of 15 μm, 31.5 parts by weight of alumina sol having solid content of 20 wt % as a component in the inorganic binder, 0.5 parts by weight of carboxymethylcellulose as organic binder, and 5 parts by weight of water are mixed and kneaded to obtain a heat-resisting paste for the adhesive layers 13.

The paste for the adhesive layers is applied so that the thickness of the adhesive layer is 1 mm, and the honeycomb units are adhered to each other and dried and solidified to form an assembly of the honeycomb units. Then, the assembly of the honeycomb units is cut into a cylindrical shape by using a diamond cutter in a manner so that the cross section perpendicular to the longitudinal direction is substantially symmetrical with respect to a point. Further, the paste for the adhesive layers 13 is applied on the outer peripheral surface so that the thickness of the outer coating layer is 0.5 mm, dried and solidified at a temperature of 120° C. by using a microwave drying apparatus and a hot air drying apparatus, and degreased at a temperature of 400° C. for two hours to obtain a honeycomb structure having a cylindrical shape, a diameter of 138 mm, and a height of 68 mm (volume: 2L).

Next, the thus-obtained honeycomb structure is impregnated with platinum nitrate solution, and kept at a temperature of 600° C. for one hour, so that 3 g/L of platinum as a noble metal catalyst is supported thereon. It should be noted that the honeycomb structure on which platinum is carried includes 2.5 mol/L of magnesium oxide.

Example 2

The same method as in example 1 is repeated except that the average particle diameter of the γ alumina used in preparing the raw material paste is 10 μm to obtain a honeycomb structure on which platinum is supported. It should be noted that the honeycomb structure on which platinum is carried includes 2.5 mol/L of magnesium oxide.

Example 3

The same method as in example 1 is repeated except that the average particle diameter of the γ alumina used in preparing the raw material paste is 0.1 μm to obtain a honeycomb structure on which platinum is supported. It should be noted that the honeycomb structure on which platinum is carried includes 2.5 mol/L of magnesium oxide.

Example 4

The same method as in example 1 is repeated except that the contents of magnesium oxide and γ alumina used in preparing the raw material paste are 650 g and 1600 g, respectively, to obtain a honeycomb structure on which platinum is not supported. Further, the thus-obtained honeycomb structure is impregnated with magnesium oxide dispersion, and kept at a temperature of 600° C. for one hour, so that 1.0 mol/L of magnesium oxide is supported thereon.

Next, the honeycomb structure on which magnesium oxide is carried is impregnated with platinum nitrate solution, and kept at a temperature of 600° C. for one hour, so that 3 g/L of platinum as a noble metal catalyst is supported thereon. It should be noted that the honeycomb structure on which platinum is carried includes 2.5 mol/L of magnesium oxide.

Comparative Example 1

A honeycomb structure is obtained, having a cylindrical shape and made of cordierite having sizes of 138 mm (diameter) and 68 mm (height) (volume: 2L), plural through holes, the number of the through holes per 1 $cm^2$ of a cross section perpendicular to the longitudinal direction being 93, the thickness of the partition wall of 0.2 mm, and a layer made of alumina formed on the surface of the partition walls. Next, the thus-obtained honeycomb structure is impregnated with magnesium oxide dispersion, and kept at a temperature of 600° C. for one hour, so that 2.5 mol/L of magnesium oxide is supported thereon.

Comparative Example 2

The same method as in example 1 is repeated except that the average particle diameter of the γ alumina used in preparing the raw material paste is 20 μm to obtain a honeycomb structure on which platinum is supported. It should be noted that the honeycomb structure on which platinum is carried includes 2.5 mol/L of magnesium oxide.

[Measurement of Specific Surface Area]

First, a specific surface area per unit volume of the honeycomb structure having a SOx storage amount "X" of 0 g is measured. Next, simulation gas at a temperature of 400° C. is supplied at a space velocity (SV) of 50000/hour to the honeycomb structure. When the SOx storage amount "X" reaches 150 g, 300 g, and 500 g, the honeycomb structure is taken out so that each of the specific surface areas per unit volume is measured. It should be noted that the components of the simulation gas are nitrogen (balance), carbon dioxide (10 vol %), oxygen (10 vol %), nitrogen monoxide (200 ppm), carbon monoxide (0 vol %), hydrocarbon (200 ppm), and sulfur dioxide (125 ppm).

Specifically, first, a ratio "A" [vol %] of the volume of the honeycomb structure to the apparent volume of the honeycomb structure including the volume of through holes is calculated. Next, a BET specific surface area "B" [$m^2/g$] of the honeycomb structure is measured. The BET specific surface area is measured by using a BET measurement apparatus, Micromeritics Flow Sorb II-2300 (SHIMAZU Corporation), in accordance with the one-point method conforming to Japanese Industrial Standards JIS-R-1626(1996). It should be noted that 2 g of crushed particles from a sample cut from the honeycomb structure is used in measuring the BET specific surface area. Further, apparent density "C" [g/L] of the honeycomb structure is calculated from the weight and the apparent volume of the honeycomb structure. Then, the specific surface area per unit volume of the honeycomb structure "Y" [$m^2/L$] is calculated by the following formula $$Y = A/100 \times B \times C$$

TABLE 1 below shows the results of the measurement.

The entire contents of JIS-R-1629 (1996) are hereby incorporated herein by reference.

velocity (SV) of 50000/hour to the honeycomb structure. The results of the measurement is shown in Table 1. It should be noted that "○" or "X " marks are indicated when SOx concentration in the gas from the honeycomb structure is 12.5 ppm or less or more than 12.5 ppm, respectively. In this case, when the SOx concentration in the gas from the honeycomb structure is 12.5 ppm, since the content of sulfur dioxide in the simulation gas is 125 ppm, the conversion rate becomes approximately 90%.

The above description shows that a sulfur dioxide conversion rate in a honeycomb structure according to the examples 1 through 4 of the present invention is equal to or more than approximately 90% when the following relation $$Y \geq -26X + 40000 \ (0 < X \leq \text{approximately } 500)$$

is satisfied. In this case, it becomes possible to control the degradation of storing SOx caused by heating.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

What is claimed is:

1. A honeycomb structure comprising:
   at least one honeycomb unit having a longitudinal direction and comprising:
   a partition wall extending along the longitudinal direction to define plural through holes;
   SOx storage agent;
   inorganic particles; and
   inorganic binder,
   wherein a first expression $Y \geq -26X + 40000$ is satisfied, and a second expression $0 < X \leq$ approximately 500 is satisfied,
   wherein "X" represents an amount [g] of SOx stored in the honeycomb structure, and "Y" represents a specific surface area [$m^2/L$] of the honeycomb structure when "X" [g] of SOx is stored in the honeycomb structure, and
   wherein, when the first and second expressions are satisfied, an effective control of degradation of SOx storing performance caused by heating the honeycomb structure is provided.

2. The honeycomb structure according to claim 1, wherein at least a part of the SOx storage agent is supported on the partition wall.

TABLE 1

| | SPECIFIC SURFACE AREA [$m^2/L$] | | | | |
|---|---|---|---|---|---|
| | SOx STORAGE AMOUNT: 0 g | SOx STORAGE AMOUNT: 150 g | SOx STORAGE AMOUNT: 300 g | SOx STORAGE AMOUNT: 500 g | SOx LEAKAGE AMOUNT |
| EXAMPLE 1 | 46400 | 42000 | 38000 | 33000 | ○ |
| EXAMPLE 2 | 43700 | 39800 | 35600 | 31000 | ○ |
| EXAMPLE 3 | 48000 | 43500 | 39200 | 34300 | ○ |
| EXAMPLE 4 | 45300 | 40800 | 36800 | 31500 | ○ |
| COMPARATIVE EXAMPLE 1 | 14300 | 13000 | 11800 | 10200 | X |
| COMPARATIVE EXAMPLE 2 | 41800 | 37000 | 32300 | 26000 | X |

Figure 3:
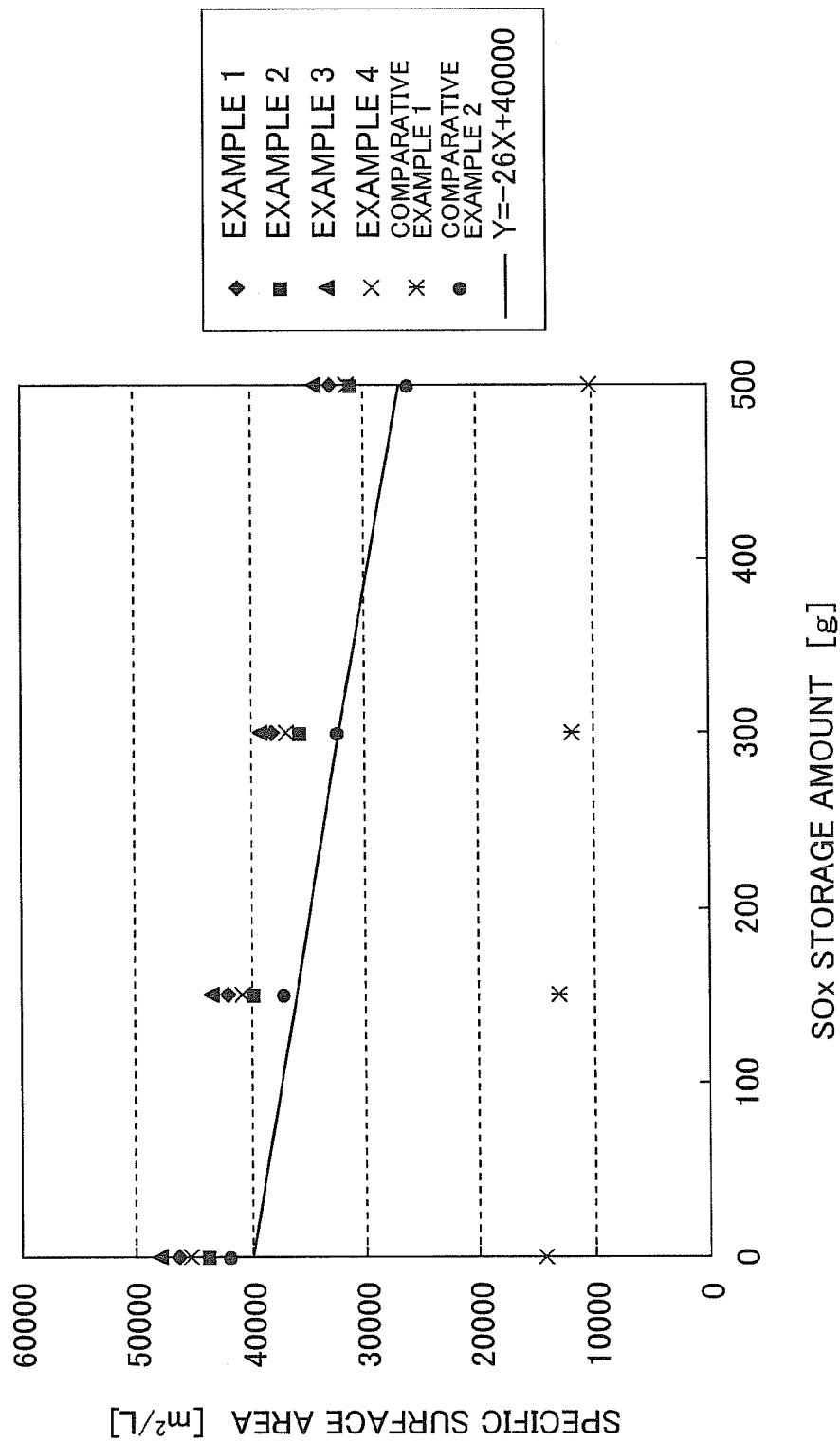
FIG. 3 is a graph showing relationships between a specific surface area per unit volume and SOx storage amount in honeycomb structure.

Further, FIG. 3 shows the relationships between a specific surface area per unit volume and SOx storage amount "X" in honeycomb structure.

[Measurement of SOx Leakage Amount]

SOx concentration in the gas from the honeycomb structure is measured using "MEXA-7100D" and "MEXA-1170SX" (both: HORIBA Ltd.) (detection limit: 0.1 ppm) until the SOx storage amount reaches 500 g, while simulation gas at a temperature of 400° C. is introduced at a space 3. The honeycomb structure according to claim 1, wherein the SOx storage agent includes at least one of an alkali metal and an alkali earth metal.

4. The honeycomb structure according to claim 3, wherein the SOx storage agent includes at least one of sodium, potassium, magnesium, calcium, and barium.

5. The honeycomb structure according to claim 1, wherein the partition wall includes the SOx storage agent at least approximately 1.0 mol/L and at most approximately 2.5 mol/L.

6. The honeycomb structure according to claim 1, wherein the specific surface area "Y" is equal to or less than approximately 70000 m$^2$/L.

7. The honeycomb structure according to claim 1, wherein the inorganic particles comprises at least one of alumina, titania, silica, zirconia, ceria, mullite, and zeolite.

8. The honeycomb structure according to claim 7, wherein the average particle diameter of the inorganic particles is at least approximately 0.1 μm and at most approximately 10 μm.

9. The honeycomb structure according to claim 7, wherein a content of inorganic particles is at least approximately 30 wt % and at most approximately 90 wt %.

10. The honeycomb structure according to claim 1, wherein the inorganic binder comprises solid content included in at least one of alumina sol, silica sol, titania sol, liquid glass, sepiolite, and attapulgite.

11. The honeycomb structure according to claim 10, wherein a content of inorganic binder in the honeycomb unit is at least about 5 wt % and at most about 50 wt %.

12. The honeycomb structure according to claim 1, wherein the honeycomb unit further includes inorganic fibers.

13. The honeycomb structure according to claim 12, wherein the inorganic fibers comprises at least one of alumina, silica, silicon carbide, silica-alumina, glass, potassium titanate, and aluminum borate.

14. The honeycomb structure according to claim 12, wherein the aspect ratio of the inorganic fibers is at least approximately 2 and at most approximately 1000.

15. The honeycomb structure according to claim 12, wherein a content of the inorganic fibers is at least approximately 3 wt % and at most approximately 50 wt %.

16. The honeycomb structure according to claim 1, wherein an area of a cross section perpendicular to the longitudinal direction of the honeycomb unit is at least approximately 5 cm$^2$ and at most approximately 50 cm$^2$.

17. The honeycomb structure according to claim 1, wherein a thickness of the partition wall is at least approximately 0.05 mm and at most approximately 0.35 mm.

18. The honeycomb structure according to claim 1, wherein a number of through holes per 1 cm$^2$ of cross section perpendicular to the honeycomb unit is at least approximately 15.5 and at most approximately 186.

19. The honeycomb structure according to claim 1, wherein an outer peripheral surface of the honeycomb structure is covered with an outer coating layer.

20. The honeycomb structure according to claim 1, wherein said at least one honeycomb unit comprises a plurality of the honeycomb units and wherein the honeycomb structure further comprises an adhesive layer provided between the plurality of the honeycomb units to connect the plurality of the honeycomb units.

21. The honeycomb structure according to claim 1, wherein said at least one honeycomb unit comprises a single honeycomb unit in the honeycomb structure.

22. The honeycomb structure according to claim 1, wherein a noble metal catalyst is carried on the partition wall.

23. The honeycomb structure according to claim 22, wherein the noble metal catalyst comprises at least one of platinum, palladium, and rhodium.

24. The honeycomb structure according to claim 1, wherein, when the first and second expressions are satisfied, the honeycomb structure is configured to provide a sulfur dioxide conversion rate that is equal to or more than approximately 90%.

* * * * *